Sept. 16, 1969     B. B. WINER ET AL     3,467,935
FUSIBLE MEANS FOR ROTATING ELECTRICAL DEVICE Filed Feb. 16, 1962                                     4 Sheets-Sheet 1

WITNESSES:
Bernard R. Gieguey
James F. Young

INVENTORS
Richard J. Keady and
Bernard B. Winer
BY
Willard R. Crout
ATTORNEY

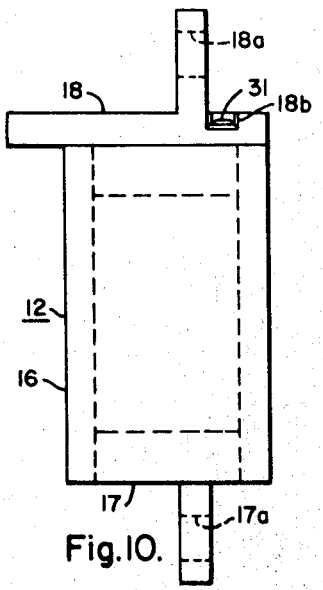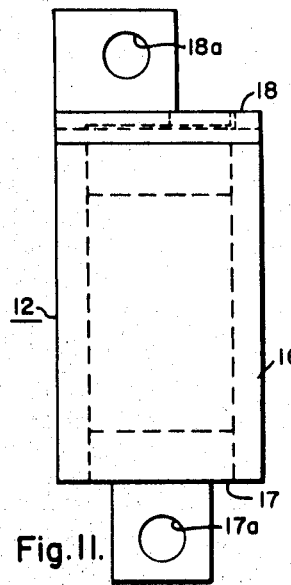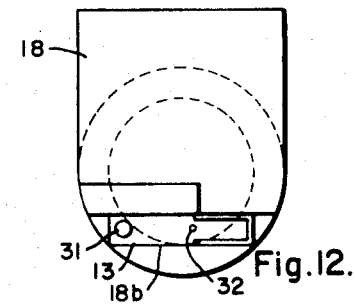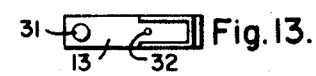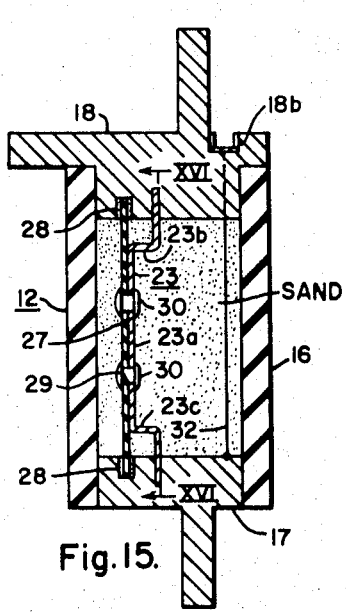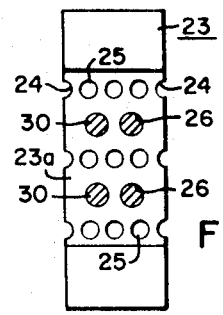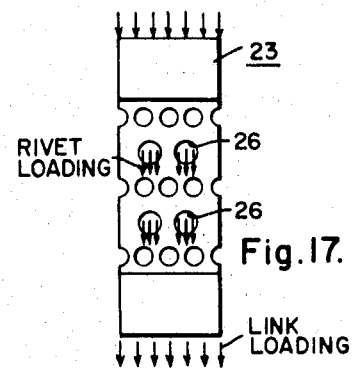

United States Patent Office 3,467,935
Patented Sept. 16, 1969

3,467,935
FUSIBLE MEANS FOR ROTATING ELECTRICAL DEVICE
Bernard B. Winer, Pittsburgh, and Richard J. Keady, Monroeville, Pa., assignors to Westinghouse Electric Corporation, Pittsburgh, Pa., a corporation of Pennsylvania
Filed Feb. 16, 1962, Ser. No. 174,370
Int. Cl. H01h 85/14
U.S. Cl. 337—229     4 Claims

ABSTRACT OF THE DISCLOSURE

A fuse assembly adapted for rotating movement and being mounted radially with respect to the axis of rotation in which the interiorly disposed fuse-link member is supported adjacent its mid-portion so as to reduce the possibility of fuse-link failure due to mechanical loads.

---

This invention relates to fusible means for rotating electrical devices in general, and, more particularly, to a fusible device capable of mounting for rotation with rotating electrical devices, which may require overload or short-circuit protection.

Many electrical devices having rotating members require overload and short-circuit protective means for the portion of the circuit mounted upon the rotating member. It would be advantageous in some instances to mount the protective means upon the same rotating member as the electrical circuit. Such an advantage has particular application to synchronous alternating-current machines of the brushless type.

The development of synchronous alternating-current machines of the brushless type has been made possible by the use of rectifying means mounted upon the rotating shaft of the machine. In such a machine an alternating-current exciter is generally mounted on the same rotating member as the field winding of the main machine. A rotating rectifier assembly is mounted upon the same rotating member for rectifying the alternating current output of the exciter for supplying direct current to the field winding. In this way, an alternating-current machine is provided which requires no commutator, slip rings or brushes, such as are necessary in the conventional type of synchronous alternating-current machine.

Some types of brushless synchronous alternating-current machines, such as turogenerators, require continuity of operation in the highest degree. Particularly, in such an application, it is necessary to furnish protective means for the rectifier assembly. A breakdown of one or more rectifier elements in the rectifier assembly could result in loss of excitation to the turbogenerator. A protective means is required, therefore, to disconnect any element, branch or phase on which a fault condition may exist. Removal of the defective elements from the circuit would allow excitation to be maintained on the turbogenerator unit. Should an excessive number of rectifier elements break down, then a quick easy means must be made available for ascertaining the number of rectifier elements which are inoperative. This would allow determination of whether the machine can continue operating until the next shutdown maintenance period, or whether shutdown of the machine should be immediate before excitation is lost completely.

A rotating protective means mounted directly upon the rotating member of the synchronous alternating-current machine must be capable of withstanding the high centrifugal forces due to the high speed of rotation, which is usually 3600 r.p.m. At the same time it must allow easy replacement of the operated, or blown protective elements, which have taken rectifier elements out of the circuit. Visual inspection of the protective means is desirable to determine the extent of its operation, so that the location and number of rectifier elements cleared from the excitation circuit can easily be determined.

The principal object of the present invention is to provide a rotating electrical device with a fusible means for protection under fault conditions.

Another object of the present invention is to provide a synchronous alternating-current machine of the brushless type with a means for protection of the excitation system under fault conditions.

Another object of the invention is to provide a rotating fuse assembly capable of withstanding the high-speed centrifugal forces usually encountered in turbogenerator applications or any high-speed machine.

Another object of the present invention is to provide a rotating fuse assembly in which the fuse elements are positioned radially upon the rotating shaft.

Still a further object of the present invention is the provision of a fuse assembly adapted for rotating movement, say at speeds up to 3600 r.p.m., in which the interiorly-disposed fuse-link members are supported adjacent their mid-portions in such a manner as to reduce the possibility of fuse-link failure due to mechanical loads.

Still a further object of the present invention is to provide an improved mounting construction for a radially-disposed fusible device upon a rotating machine.

An ancillary object of the present invention is to provide an improved indicating device for a rotatable fuse assembly, in which the centrifugal forces applied to the rotating elements assist in biasing the indicating device to an indicating position.

Yet a further object of the present invention is to provide an improved indicating-type fusible device of the type set forth in the immediately preceding paragraph, in which the construction is such that the indicating position of the indicator is readily observable by maintenance and/or operating personnel.

Further objects and advantages will readily become apparent upon reading the following specification, taken in conjunction with the accompanying drawings, in which:

FIG. 10 is a side elevational view of the fusible assembly;

FIG. 11 is a plan view of the fusible assembly of FIG. 10;

FIG. 12 is an end elevational view of the fusible assembly;

Figure 1:
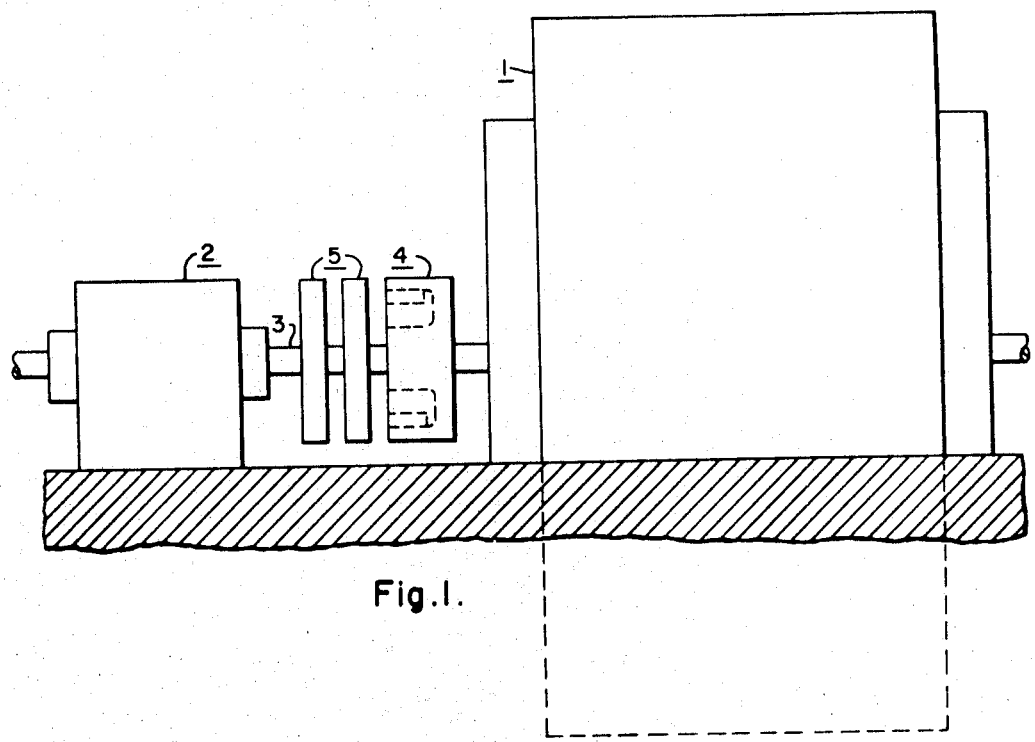
FIGURE 1 is an elevational view of an illustrative embodiment of the present invention in the excitation system of a turbogenerator.

FIGS. 13 and 14 collectively illustrate the fuse indicator in its indicating position;

FIG. 15 is a longitudinal sectional view taken through the fusible element assembly of FIGS. 10–12;

FIG. 16 is a sectional view taken along the line XVI—XVI of FIG. 15; and,

FIG 17 is a view similar to FIG. 16, but illustrating the reactions at the end of the fusible element and at the rivet supports due to the load exerted by the fuse link.

The invention is shown in the drawings, for the purpose of illustration, in a typical embodiment in the excitation system of a brushless alternating-current turbogenerator. It is to be understood, however, that the present invention is not restricted in its application to turbogenerators, but is generally applicable to any synchronous machine of the brushless type or, in its broader aspects, for any rotating electrical device requiring fusible means on a rotating member.

In the illustrated form of embodiment of the invention, a turbogenerator 1 and an alternating-current main exciter 2 have a common rotating shaft 3 which shaft also provides means for driving the turbogenerator 1, usually by a steam turbine, not illustrated. A rectifier assembly 4 and a fuse wheel 5 also mounted on the common rotating shaft 3 of the exciter 2 and turbogenerator 1, complete the typical embodiment shown.

Figure 2:
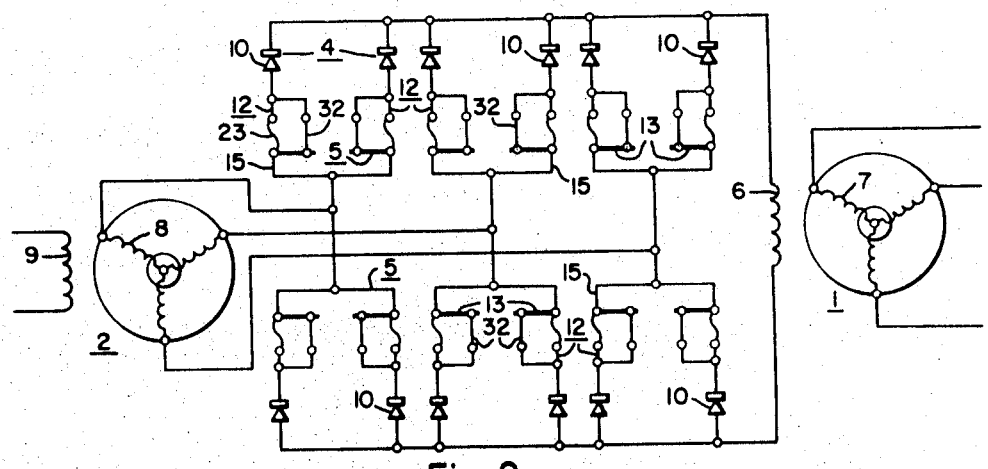
FIG. 2 is a schematic diagram of the electrical connections for the machine of FIG. 1.

As shown in FIG. 2, the turbogenerator 1 has a direct-current rotating field winding 6 cooperating with a three-phase stationary armature winding 7. The alternating-current main exciter 2 has a three-phase rotating armature winding 8 cooperating with a direct current stationary field winding 9. Direct-current excitation to the stationary field winding 9 of the main exciter 2 may be provided by any suitable means, such as a pilot exciter of the permanent-magnet type, not shown.

The three-phase full wave rotating rectifier assembly 4 includes a plurality of rectifier elements 10, and provides means for rectifying the output of the three-phase alternating current armature winding 8 for the direct-current field winding 6. Of course, any suitable rectifier circuit can be utilized. The physical construction of the rectifier assembly 4 may be of any desired type, one suitable construction being described and claimed in a copending application of Victor G. Sorokin et al., Ser. No. 702,166, filed Dec. 11, 1957, now U.S. Patent 2,972,711, issued Feb. 21, 1961. This completes the general construction of the brushless-type synchronous machine.

As stated previously, a protective means, such as a fusible device, is necessary, or at least highly desirable in such an application because of the possibility that some of the rectifier elements 10 may individually break down and fail, requiring thereby the removal of the faulty rectifier elements 10 from the excitation circuit. Removal of the faulty rectifier elements 10 requires that the remaining elements 10 carry the total load. In general, there will be two or more rectifier elements 10 in parallel in each branch of the circuit, so that upon failure of any individual element 10, or a reasonable number of them, the remaining elements 10 will be capable of carrying the load for a reasonable period of time. If a particular branch, or phase of rectifier elements becomes overloaded, such phase is disconnected from the excitation circuit, so that the remaining branches and phases then carry the total load. In accordance with the present invention, the necessary protection is provided by means of the fuse wheel 5. The fuses are applied with sufficient rating to take care of rated overloads as well as a predetermined number of fuse failures due to breakdown of the rectifier elements 10, which they are assigned to protect.

The fuse wheel 5 must be capable of withstanding the high centrifugal forces accompanying 3600 r.p.m. operation. At the same time, visual means for determining the number of rectifier elements 10 still in the excitation circuit is highly desirable so that scheduled shutdowns can be determined.

Figure 3:
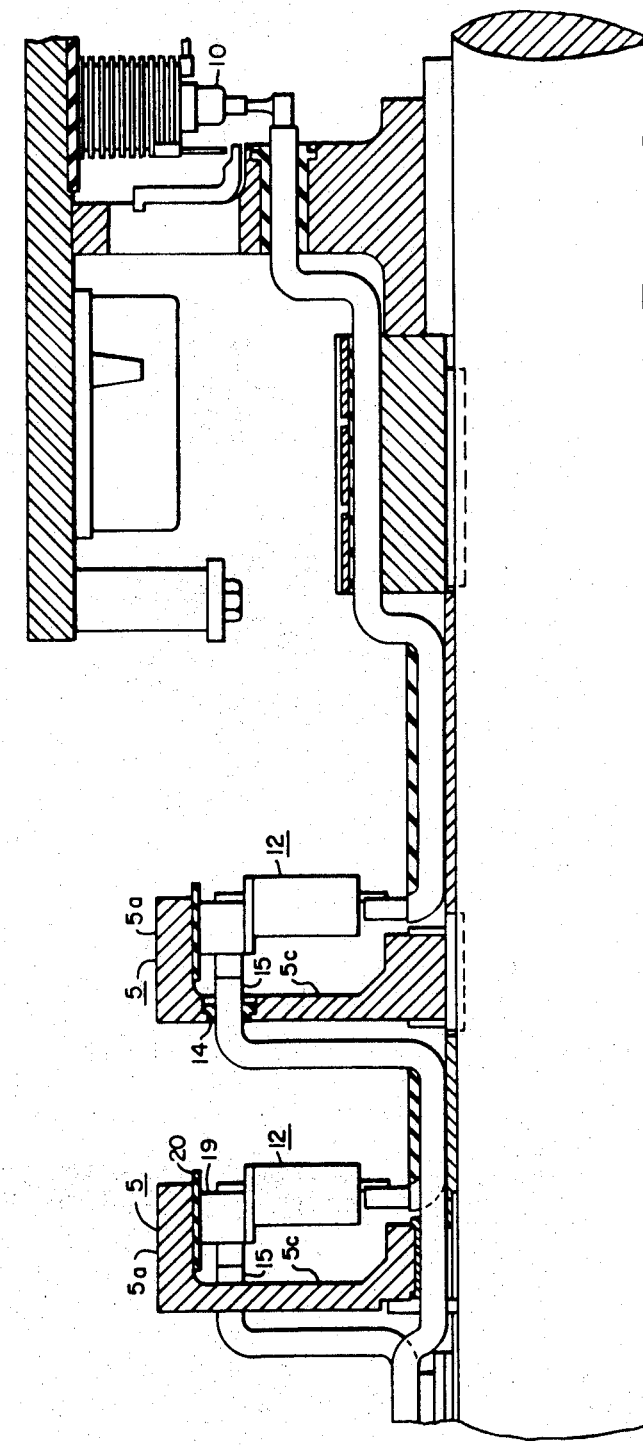
FIG. 3 is an enlarged detailed view of a portion of the rotating apparatus of FIG. 1 illustrating a portion of the fuse wheel.
Figure 4:
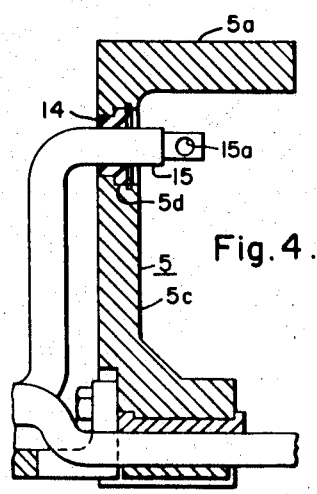
FIG. 4 illustrates fragmentarily a portion of the fuse wheel and resistor sleeve assembly before mounting upon the rotating shaft.

The fuse wheel 5, containing the fuse assembly 12 is more clearly illustrated in FIG. 3 of the drawings with each fusible device 12 connected in series with a rectifying element 10. In parallel connection with each fuse device 12 is a means for visually indicating the operation of each individual fuse device 12. This means, as more clearly shown in FIGS. 13 and 14, constitutes an indicating flipper 13, which is released upon rupture of the fusible device 12 and provides a means of external indication for indicating the rupture of the particular fuse device 12.

Suitable stroboscopic scanning equipment, which may be of any conventional type, may be utilized to locate any blown fusible device 12. As pointed out previously, such visual means provides indication for detection of the operation of the fuse 12 while the fuse wheel 5 is rotating, as is required. This provides a means for determining the number of rectifier elements 10 which are still in workable condition, and connected in the excitation circuit of the turbogenerator 1.

Figure 6:
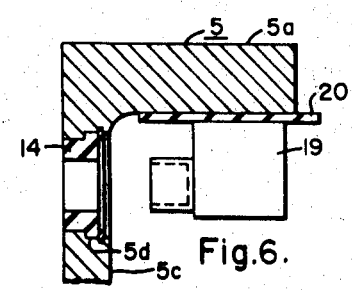
FIG. 6 is a sectional view taken substantially along the line VI—VI of FIG. 5.
Figure 5:
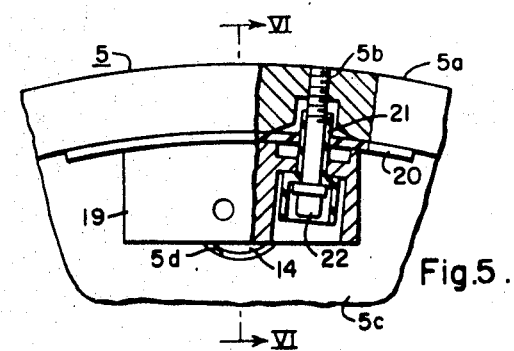
FIG. 5 is a fragmentary end view of a portion of the fuse wheel illustrating the support for the fuse element.

With reference to FIGS. 5 and 6, it will be apparent that the fuse wheel 5 has an outer peripheral flange portion 5a which has spaced pairs of mounting holes 5b provided therein. Additionally, extending through a radial web portion 5c of the fuse wheel 5 are a plurality of spaced, circumferentially-located, lead holes 5d, through which slotted insulating plugs 14 may be disposed. Lead connections 15 may be extended through the slotted plugs 14 and preferably have mounting holes 15a provided therein.

Figure 7:
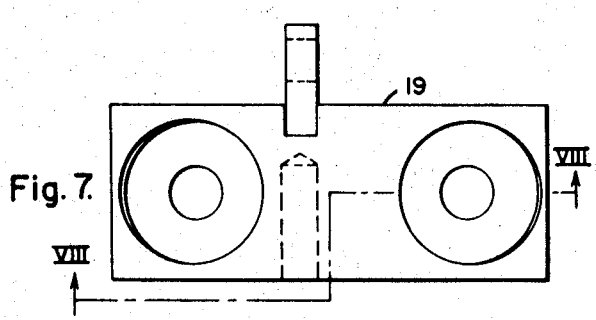
FIG. 7 is a detailed top plan view of the conducting mounting block for the outer end of the fusible element.
Figure 9:
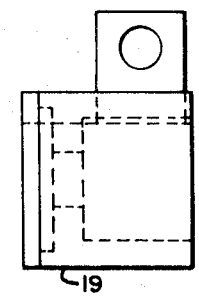
FIG. 9 is an end elevational view of the fuse block of FIGS. 8 and 9.
Figure 8:
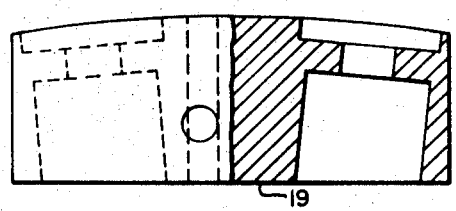
FIG. 8 is a sectional view of the fuse block of FIG. 7 taken along the line VIII—VIII thereof.

With reference to FIGS. 10–12 of the drawings, it will be noted that the fusible device 12 comprises an insulating casing 16 formed of a suitable high-strength material, such as glass melamine, and having end terminal connectors 17, 18 each having a terminal-mounting hole 17a, 18a, respectively, provided therethrough. The terminal connector 18 constitutes a mounting lug, which may be fixedly secured and connected to a conducting mounting block 19. The conducting mounting block 19, as more clearly shown in FIGS. 7–9, is insulatedly supported interiorly of the flange portion 5a, and thereby is prevented from any radial movement. As shown in FIG. 5, a segmental insulating plate 20, together with an insulating bushing 21, is provided to insulate the conducting block 19 from the fuse wheel 5 and the mounting bolt 22 from the conducting block 19.

As shown more clearly in FIG. 3, the fusible devices 12 are disposed radially of the rotating apparatus, so that the one or more parallel-disposed fusible elements 23, shown more clearly in FIGS. 15–17, are disposed radially of the rotating apparatus. Each fusible element 23 is preferably provided with notches 24 and holes 25. However, other fuse link configuration may be employed, such as fuse links with "necked-down" portions, as well known by those skilled in the art. In addition, the link 23 is provided with preformed rivet holes 26. As shown in FIG. 15, a radially-extending insulating support strip 27 is provided extending within notches, or slots 28 provided in the end terminal lugs 17, 18, and is, in addition, provided with rivet holes 29, which register with the rivet holes 26 of the fusible elements 23. Suitable rivets 30 are employed to fixedly secure the mid-portions 23a of the fusible elements 23 to the supporting strips 27.

As well known by those skilled in the art, the rating and characteristics of the fusible device 12 is determined by the number and cross-sectional area of the fusible elements 23 together with the disposition and size of the notches 24 and holes 25. For purposes of illustration, there is only shown one fusible strip 23, which preferably is composed of a suitable conducting material, such as silver, for example. By providing the fusible elements 23 with flexible end portions 23b and 23c, in this particular instance comprising two right-angle bends, flexibility radially of the fusible element 23 is provided. An arc-quenching solid material, such as sand, fills the fuse casing 16.

The indicator flapper 13, as shown in FIGS. 13 and 14, is preferably made from a resilient metallic material, such, for example, as phosphorous bronze. It is secured at one end by a screw 31 within a slot 18b of the terminal connector 18. The other end of the indicator 13 is secured to a fuse wire 32 (FIG. 15) of relatively high resistance, which extends through the interior of the fuse casing 16, and is electrically connected to the other end terminal plug 17. As well known by those skilled in the art, rupture of the fuse links 23 will also result in immediate breaking of the fuse wire 32 and hence permissive flexing of the indicator 13 to the position indicated in FIG. 14. Centrifugal forces assist this indicating motion.

From the foregoing description, it will be apparent that there is provided an improved electrical fuse 12 designed to provide overload protection while operating under high mechanical loads imposed by rotation at speeds up to 3600 r.p.m. (and overspeeds) at radii consistent with mounting and space limitations. As shown, the fusible device 12 comprises one or more silver links 23 mounted inside a sand-filled glass melamine tube 16 and joined on both ends to conducting end plates 17, 18, which provide mounting lugs. Although the illustrated embodiment shows one silver link 23, it will be obvious to those skilled in the art that other fuse-link configurations, having more links would be treated in a similar manner. The number of fuse links 23 required is, of course, dictated by the normal amperage requirements of the fusible element 12.

Fuse-link design, as regards notching and aperture formation, is determined by the fuse characteristics necessary for circuit protection. The present invention is, in part, particularly concerned with a means of mounting the fusible elements 23 which reduces the centrifugal stresses to values which permit continuous operation of the fuse element 23 without danger of fuse-link failure due to mechanical loads.

It will be noted that the fuse-link element 23 is mounted radially to minimize bending stresses. Major stresses are, therefore, either direct tension or compression. As shown, an insulating support strip 27 is provided for each fusible element 23 to provide mechanical support for the link 23 to eliminate buckling of the link 23, and to transfer centrifugal forces from the fuse link 23 to the insulation support strip 27. Attachment of the link 23 to the support strip 27 is preferably accomplished by means of rivets 30, which are swaged into prepunched holes 26, 29, provided respectively in the link 23 and strip 27 and thereby provide maximum assurance that all rivets 30 carry load equally.

As shown in FIG. 15, the support strip 27 is interposed between the link 23 and the outer insulating tube 16 to reduce the possibility of thermal damage to the tube 16 when the fusible element 23 blows. Flexibility is provided at the ends of the fuse links 23 where they join to the conducting end plates 17, 18. This flexibility ensures that the major portion of the centrifugal load is carried by the support strip 27 and not by the fuse link 23, and moreover that assembly variations will not introduce stresses into the fuse links 23.

Tests have verified the reliability of the particular fuse construction 12 disclosed. The fuses were operated under essentially constant mechanical and electrical load conditions for 100 hours with no change in the millivolt drop across the fuse 12 at any time during the tests. X-ray photographs of the fusible devices 12 also indicated no distortion of the fuse elements 23. In contrast to this, tests on standard fuses (designed for static applications) have shown that mechanical creep failures of the silver link occur within a few hours.

Certain features of the present invention are set forth and described in U.S. patent application filed Aug. 1, 1958, by Gerhard P. Lessmann, Ser. No. 752,467, now U.S. Patent 3,030,531, issued Apr. 17, 1962, entitled "Protective Means for Rotating Electrical Device," and assigned to the assignee of the instant application.

Although there has been illustrated and described a particular fusible structure and support therefor, it is to be clearly understood that the same were merely for the purpose of illustration, and that changes and modifications may readily be made therein by those skilled in the art without departing from the spirit and scope of the invention.

We claim as our invention:

1. A current-limiting cell fuse for rotating rectifiers comprising: a tubular casing of insulating material; a pair of terminal plugs fitted into the ends of said casing each having on the axially inner surface thereof at least one pair of spaced parallel grooves; an insulating plate arranged inside said casing in a direction longitudinally thereof and having axially outer ends each projecting into one of said pair of grooves; a ribbon fuse link arranged inside of said casing exceeding in length the spacing between said axially inner surface of each of said pair of plugs, said link projecting with each of the axially outer ends thereof into another of said pair of grooves, and said link including a portion of reduced cross-section situated between said axially outer ends thereof, bent out of the plane defined by said axially outer ends thereof into the plane defined by said plate and in abutting relation with said plate; and fastener means projecting through said portion of said link and through said plate and securing said portion of said link to said plate.

2. A current limiting cell fuse for rotating rectifiers of the type having a fuse casing and a fuse element extending through said casing and adapted to be mounted on rotating means with the fuse casing extending in a radial direction from the axis of rotation comprising: a tubular casing of insulating material; a pair of terminal plugs for the ends of said casing respectively, each of said terminal plugs being secured to said tubular casing of insulating material; an insulating plate disposed inside said casing in a direction longitudinally thereof and extending to the pair of terminal plugs and secured to both terminal plugs; a ribbon fuse link arranged inside of said casing exceeding in length the spacing between the axially inner surfaces of said pair of plugs and having the ends thereof making electrical connection with said pair of plugs respectively, said link including a portion of reduced cross-section situated between said ends, a plurality of means securing said link to said insulating plate on both sides of said portion of reduced cross-section whereby substantial axial movement of the fuse link in response to contrifugal forces applied thereto is prevented, the positions whereat the ends of the fuse link make electrical connection with the respective terminal plugs being substantial distances from the positions whereat the ends of the plate of insulating material are secured to said plugs; portions of the fuse link between the securing means and the respective ends of the fuse link being substantially bent before reaching the positions whereat the ends of the fuse link make electrical connection with the terminal plugs, the bent portions providing flexibility and ensuring that the major portion of the centrifugal load is carried by the insulating plate.

3. A current limiting cell fuse for rotating rectifiers of the type having a fuse casing and a fuse element extending through said casing and adapted to be mounted on rotating means with the fuse casing extending in a radial direction from the axis of rotation comprising: a tubular casing of insulating material; a pair of terminal plugs for the ends of said casing respectively, each of said terminal plugs being secured to the casing; a fuse link extending longitudinally inside of the casing and being electrically connected at the ends thereof to the terminal plugs respectively, the fuse link having a central portion thereof which lies in a plane substantially parallel to the longitudinal axis of the tubular casing, the portions of the fuse link between said central portion and the ends of the fuse link lying at least partially in a plane transverse to said first named plane, the central portion of the fuse link including a portion of reduced cross-section; an insulating plate extending through the tubular casing in a direction longitudinally thereof and secured at both ends to the terminal plugs respectively; and means securing the fuse link to the insulating plate on each side of the portion of reduced cross-section and thereby maintaining a portion of the fuse link in a plane parallel to the longitudinal axis of the tubular casing, said portions of the fuse link between said central portion and the ends of the fuse link providing flexibility and ensuring that the major portion of the centrifugal load is carried by the insulating plate.

4. A fuse according to claim 2 including in addition means for indicating when the fuse has blown.

References Cited

UNITED STATES PATENTS

| | | | |
|---|---|---|---|
| 1,919,273 | 7/1933 | Conant | 337—248 X |
| 2,914,636 | 11/1959 | Kozacka | 200—120 X |
| 3,080,463 | 3/1963 | Kozacka | 200—131 X |
| 2,530,228 | 11/1950 | Cihlar | 200—117 X |
| 307,639 | 11/1884 | Gilliland | 200—121 |
| 2,665,348 | 1/1954 | Kozacka | 200—131 X |
| 3,020,370 | 2/1962 | Swain | 200—120 |
| 2,897,383 | 7/1959 | Barrows | 310—68 |
| 3,030,531 | 4/1962 | Lessmann | 310—68 |

FOREIGN PATENTS 110,729   5/1944   Sweden.

BERNARD A. GILHEANY, Primary Examiner

H. B. GILSON, Assistant Examiner

U.S. Cl. X.R.

337—248